United States Patent
Miki et al.

(10) Patent No.: US 10,256,960 B2
(45) Date of Patent: Apr. 9, 2019

(54) MOBILE COMMUNICATION SYSTEM, BASE STATION APPARATUS, USER EQUIPMENT, AND METHOD

(71) Applicant: NTT DOCOMO, INC., Tokyo (JP)

(72) Inventors: Nobuhiko Miki, Yokohama (JP);
Mamoru Sawahashi, Yokohama (JP);
Kenichi Higuchi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/031,960

(22) Filed: Sep. 19, 2013

(65) Prior Publication Data
US 2014/0086170 A1    Mar. 27, 2014

Related U.S. Application Data

(63) Continuation of application No. 12/811,839, filed as application No. PCT/JP2008/073723 on Dec. 26, 2008.

(30) Foreign Application Priority Data

Jan. 8, 2008  (JP) .................................. 2008-001667

(51) Int. Cl.
*H04W 4/00* (2009.01)
*H04L 5/00* (2006.01)
(Continued)

(52) U.S. Cl.
CPC .......... *H04L 5/0055* (2013.01); *H04L 1/1607* (2013.01); *H04L 1/1861* (2013.01); *H04L 5/0053* (2013.01); *H04L 27/3405* (2013.01)

(58) Field of Classification Search
None
See application file for complete search history.

(56) References Cited

U.S. PATENT DOCUMENTS 8,189,556 B2    5/2012  Lee et al.
8,774,297 B2 *  7/2014  Lee .................... H04B 7/0678
                                                        375/260
(Continued)

FOREIGN PATENT DOCUMENTS

JP    2007-214783 A    8/2007

OTHER PUBLICATIONS

3GPP TSG RAN WGI#50, R1-073479, "Mapping Relations between UL VRB and DL ACK/NACK," Aug. 20, 2007 (5 pages).*
(Continued)

*Primary Examiner* — Faruk Hamza
*Assistant Examiner* — Thinh Tran
(74) *Attorney, Agent, or Firm* — Osha Liang LLP

(57) ABSTRACT

A base station apparatus is used in a mobile communication system in which at least a shared data channel is transmitted by an orthogonal modulation scheme using an I-channel and a Q-channel. The base station apparatus includes a providing unit providing Acknowledgement/Non-Acknowledgement information indicating whether retransmission of a signal received in uplink is required; a mapping unit mapping a number of multiplexed users of the Acknowledgement/Non-Acknowledgement information to the I-channel or the Q-channel based on a predetermined mapping table; and a reporting unit reporting the Acknowledgement/Non-Acknowledgement information to the respective users. The mapping table indicates that, when the number of the multiplexed users is equal to or less than a predetermined number, the Acknowledgement/Non-Acknowledgement information is associated with the I-channel or the Q-channel, and otherwise, the Acknowledgement/Non-Acknowledgement information is associated with the I-channel and the Q-channel.

5 Claims, 10 Drawing Sheets

(51) Int. Cl.
*H04L 1/16* (2006.01)
*H04L 1/18* (2006.01)
*H04L 27/34* (2006.01)

(56) References Cited

U.S. PATENT DOCUMENTS

| | | | |
|---|---|---|---|
| 2006/0268720 A1 | 11/2006 | Rong et al. | |
| 2008/0137605 A1* | 6/2008 | Berg | 370/330 |
| 2009/0010240 A1* | 1/2009 | Papasakellariou | H04L 5/0007 370/344 |
| 2014/0036839 A1* | 2/2014 | Kolding et al. | 370/329 |

OTHER PUBLICATIONS

3GPP TSG RAN1#51, R1-074580; "PHICH Channel Structure"; Motorola; Jeju, Korea; Nov. 5-9, 2007 (2 pages).*
Lee et al., Method of transmit antenna diversity in cellular multicarrier communication system, U.S. Appl. No. 60/983,234, filed Oct. 25, 2007.*
Qualcomm Europe; "PHICH resource allocation"; 3GPP TSG-RAN WG1 #51, R1-074955; Jeju, Korea, Nov. 5-9, 2007 (3 pages).*
R1-051395, "Mapping position of control channel for Uplink SC-FDMA", TSG-RAN WG1 #43, Nov. 11, 2005 (Year: 2005).*
International Search Report w/translation from PCT/JP2008/073723 dated Mar. 10, 2009 (4 pages).
3GPP TSG RAN WG1 Meeting #50bis, R1-074169; "PUCCH allocation for ACK/NACK transmission"; NEC Group; Shanghai, China; Oct. 8-12, 2007 (5 pages).
3GPP TSG RAN WG1 Meeting #51, R1-074720; "Detail on mapping between ACK/NACK index and CCE index"; NEC Group; Jeju, Korea; Nov. 5-9, 2007 (4 pages).
3GPP TSG RAN1 #51, R1-074588; "PHICH Assignment in E-UTRA"; Motorola; Jeju, Korea; Nov. 5-9, 2007 (3 pages).
3GPP TSG RAN WG1 Meeting #50, R1-073657; "ACK/NACK modulation with UL data"; Nokia Siemens Network, Nokia; Athens, Greece; Aug. 20-24, 2007 (4 pages).
3GPP TS 36.211 V0.2.2; "3rd Generation Partnership Project; Technical Specification Group Radio Access Network; Physical Channels and Modulation"; Dec. 2006 (26 pages).
3GPP TR 25.814 V7.0.0; "3rd Generation Partnership Project; Technical Specification Group Radio Access Network; Physicial layer aspects for evolved Universal Terrestrial Radio Access (UTRA)"; Jun. 2006 (126 pages).
3GPP TSG RAN WG Meeting #47bis, R1-070103; "Downlink L1/L2 Control Signaling Channel Structure: Coding"; Sorrento, Italy; Jan. 15-19, 2007 (17 pages).
Office Action in corresponding Chinese Patent Application No. 200880127821.4 dated Mar. 11, 2013, with translation (15 pages).
3GPP TS 36.300 V8.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Dec. 2007 (120 pages).
Office Action in corresponding Japanese Patent Application No. 2012-281671 mailed Aug. 13, 2013 with translation (5 pages).
Written Opinion from PCT/JP2008/073723 dated Mar. 10, 2009 with translation (6 pages).
Office Action in corresponding U.S. Appl. No. 12/811,839, mailed Oct. 8, 2014 (31 pages).
Extended European Search Report in corresponding European Patent Application No. 08870296.4, dated May 20, 2015 (9 pages).
Office Action issued in the counterpart Chinese Patent Application No. 201410031325.6, dated Jun. 15, 2016 (20 pages).
Extended Search Report issued in the counterpart European Patent Application No. 161756820, dated Oct. 17, 2016 (8 pages).

* cited by examiner

MOBILE COMMUNICATION SYSTEM, BASE STATION APPARATUS, USER EQUIPMENT, AND METHOD

CROSS-REFERENCE TO RELATED APPLICATIONS

This application is a continuation of U.S. patent application Ser. No. 12/811,839, filed on Jul. 7, 2010, which is a national stage application of PCTJP2008073723, filed Dec. 26, 2008, which claims priority to Japanese Patent Application No. 2008-001667, filed Jan. 8, 2008. The priority applications are hereby incorporated by reference in their entirety.

TECHNICAL FIELD

The present invention generally relates to a technical field of a mobile communication, and more particularly to a mobile communication system, a base station apparatus, user equipment, and method using a next-generation mobile communication technique.

BACKGROUND ART

In this type of technical field, a next-generation mobile communication system of the so-called third-generation system has been studied by 3GPP (3RD Generation Partnership Project) which is a standards body of the W-CDMA (Wideband Code Division Multiple Access). Especially, as a next-generation system of the W-CDMA (Wideband Code Division Multiple Access) system, the HSUPA (High Speed Uplink Packet Access) system, the HSDPA (High Speed Downlink Packet Access) system and the like, a Long term Evolution (LTE) system has been studied at high speed. In the LTE system, as a radio access system, an OFDM (Orthogonal Frequency Division Multiplexing) scheme and an SC-FDMA (Single-Carrier Frequency Division Multiple Access) scheme have been studied to be applied to the downlink communications system and the uplink communications system, respectively (see, for example, Non-Patent Document 1).

The OFDM scheme is a multi-carrier transmission scheme in which a frequency band is divided into plural narrower frequency bands (sub-carriers), and data to be transmitted are mapped onto the sub-carriers. By closely and orthogonally arranging the sub-carriers along the frequency axis, the achievement of faster transmission and further improvement of the efficiency of using the frequency are expected.

The SC-FDMA scheme is a single carrier transmission scheme in which a frequency band is divided for each user equipment (hereinafter may be referred to as a user equipment (UE) terminal) in a manner such that different frequencies can be separately used (allocated) among plural terminals (user equipment (UE) terminals). as a result, interference between the terminals may be easily and effectively reduced. Further, preferably, in the SC-FDMA scheme, a range of transmission power fluctuation may be made smaller; therefore, lower energy consumption in terminals may be achieved, and a wider coverage area may also be obtained.

In both uplink and downlink of the LTE system, communications are performed by allocating one or more resource blocks (RBs) or resource units (RUs). The resource blocks are shared among the plural user equipment (UE) terminals. In the LTE system, the base station apparatus determines which resource blocks are allocated to which user equipment (UE) terminals among the plural user equipment (UE) terminals for each sub-frame having a duration of 1 ms. The sub-frame may also be called a Transmission Time Interval (TTI). The determination of the allocation of radio resources is called scheduling. In downlink communication, the base station apparatus transmits a shared channel using one or more resource blocks to the user equipment (UE) terminal selected in the scheduling. This shared channel may be called a Physical Downlink Shared CHannel (PDSCH). On the other hand, in uplink communication, the user equipment (UE) terminal selected in the scheduling transmits a shared channel using one or more resource blocks to the base station apparatus. This shared channel may be called a Physical Uplink Shared CHannel (PUSCH).

Further, in the communication system using the shared channels, it is required to perform Signaling to report which shared channels are to be allocated to which user equipment (UE) terminals for each sub-frame. To perform the Signaling, a control channel is generally used. In the LTE system, the control channel may be called a Physical Downlink Control CHannel (PDCCH) or a Downlink L1/L2 Control Channel (DL–L1/L2 Control Channel). A downlink control signal may include not only this PDCCH but also a Physical Control Format Indicator CHannel (PCFICH) and a Physical Hybrid Indicator CHannel (PHICH) and the like.

The PDCCH may include, for example, the following information items (see, for example, Non-Patent Document 2).

Downlink Scheduling Information;
Uplink Scheduling Grant;
Overload Indicator; and
Transmission Power Control Command Bit The Downlink Scheduling Information includes, for example, information of the downlink shared channel, and specifically, allocation information of downlink resource blocks, identification information of user equipment (UE) terminal (UE-ID), the number of streams, information of Pre-coding vector, data size, modulation scheme, information of HARQ (Hybrid Automatic Repeat ReQuest) and the like.

On the other hand, the Uplink Scheduling Grant includes, for example, information of the uplink shared channel, and specifically, allocation information of uplink resource blocks, identification information of user equipment (UE) terminal (UE-ID), data size, modulation scheme, information of uplink transmission power, Demodulation Reference Signal in uplink MIMO (Multiple Input Multiple Output) and the like.

The PCFICH transmits a format of PDCCH. More specifically, the number of OFDM symbols used for the PDCCH is transmitted using the PCFICH. In the LTE system, the number of OFDM symbols used for the PDCCH is 1, 2, or 3, and the OFDM symbol(s) within a subframe are sequentially mapped from the first OFDM symbol of the subframe.

The PHICH includes Acknowledgement/Non-Acknowledgement information (ACK/NACK) indicating whether the PUSCH transmitted in uplink is required to be retransmitted.

As far as the definition of the terms is concerned, the PDCCH, the PCFICH, and the PHICH may be defined as equivalent channels independent from each other, or, for example, may be defined in a manner such that the PDCCH includes the PCFICH and the PHICH.

In uplink, the PUSCH transmits user data (normal data signal) and accompanying control information. Further, besides the PUSCH, a Physical Uplink Control CHannel (PUCCH) transmits downlink CQI (Channel Quality Indicator), the Acknowledgement/Non-Acknowledgement information (ACK/NACK) of the PDSCH and the like. The CQI is used as in, for example, the scheduling process, AMCS (Adaptive Modulation and Coding Scheme) of the PDSCH and the like. In uplink, a Random Access CHannel (RACH) and a signal requesting for the allocation of uplink/downlink radio resources may be transmitted on an as-needed basis.

FIG. 1 schematically shows an example of mapping of a downlink signal. In this example of FIG. 1, a Reference Signal (RS) and the PHICH (Physical Hybrid ARQ Indicator Channel, or ACK/NACK) are mapped to the first OFDM symbols. For example, a sub-frame having a duration of 1 ms may have two slots, each slot having a duration of 0.5 ms. One slot may include, for example, six or seven OFDM symbols. As described above, the first one up to three OFDM symbols within one sub-frame are used for the downlink control signal (and the reference signal (RS)).

On the other hand, the PHICH expresses the ACK/NACK. Because of this feature, the PHICH may be essentially expressed by one bit. However, the PHICH (ACK/NACK) is the most fundamental information in retransmission control, and may greatly influence the system throughput. In this regard, the PHICH (ACK/NACK) largely differs from other control information items. In the example of FIG. 1, the PHICH (ACK/NACK) per single user is spread by using a Spreading Factor (SF) (for example SF=4), and the PHICHs of four users are code division multiplexed in four sub-carriers (the number (4) of the users is the same as that (4) of the sub-carriers). In this example of FIG. 1, to improve the reliability, the PHICHs of the four users are mapped to three different regions on the frequency axis. In other words, the PHICHs of the four users are simultaneously transmitted using three different frequencies.

In general signal transmission, to improve the transmission efficiency, an orthogonal modulation scheme is used. However, from the viewpoint of transmission efficiency, it may not be preferable to transmit such one-bit information as the ACK/NACK by dividing it into an In-phase component (I-ch) and a Quadrature component (Q-ch). Therefore, it is thought that the PHICH should be transmitted by using only one of the two components orthogonal to each other.

FIG. 2 schematically shows a state where the PHICHs of four users are code division multiplexed on four sub-carriers and mapped to only the I-channel (I-ch). Alternatively, the PHICHs of the four users may be mapped to only the Q channel (Q-ch).

FIG. 3 schematically shows a state where the PHICHs of eight users are code division multiplexed on four sub-carriers and mapped to the I-channel (I-ch) and the Q-channel (Q-ch). In this case, the PHICH of one user is mapped to either the I-channel (I-ch) or the Q-channel (Q-ch). From the viewpoint of increasing the number of multiplexed users, it may be preferable to multiplex the PHICHs of the users as shown in FIG. 3. By mapping the ACK/NACKs of four users to the I-channel (I-ch) and mapping the ACK/NACKs of the other four users to the Q-channel (Q-ch), the number of multiplexed users (amount of transmitted information) can be doubled (see, for example, Non-Patent Document 4).

Non-Patent Document 1: 3GPP TR 25.814 (V7.0.0), "Physical Layer Aspects for Evolved UTRA," June 2006
Non-Patent Document 2: 3GPP R1-070103, Downlink L1/L2 Control Signaling Channel Structure: Coding
Non-Patent Document 3: 3GPP TR 36.211 (V0.2.2), "Physical Channel and Modulation", November 2006
Non-Patent Document 4: 3GPP R1-074580 "PHICH Channel Structure", Motorola, November 2007

DISCLOSURE OF INVENTION

Problems to be Solved by the Invention

In order to improve the transmission efficiency of the ACK/NACK of the users by separately using the I-channel and the Q-channel as are shown in FIG. 4, it is required that the orthogonality between the I-channel and the Q-channel be precisely maintained. However, practically, a slight error may be included in the channel estimation accuracy, thereby violating the orthogonality (as shown in FIG. 5). When the orthogonality is disturbed, there may arise a concern of interference between the I-channel and the Q-channel, causing wrong recognition of the ACK/NACK and eventually degrading the system throughput.

An object of the present invention is to improve the transmission efficiency and the received quality of the Acknowledgement/Non-Acknowledgement information (ACK/NACK) indicating whether the uplink signal is required to be retransmitted.

Means for Solving the Problems

According to an embodiment of the present invention, there is provided a mobile communication system having a base station apparatus and a user equipment (UE) terminal wirelessly communicating with the base station apparatus. In this system, at least a shared channel is transmitted by the orthogonal modulation scheme using the I-channel and the Q-channel. The base station includes a providing unit providing Acknowledgement/Non-Acknowledgement information indicating whether retransmission of a signal received in uplink is required; a mapping unit mapping a number of multiplexed users of the Acknowledgement/Non-Acknowledgement information to the I-channel or the Q-channel based on a predetermined mapping table; and a reporting unit reporting the Acknowledgement/Non-Acknowledgement information to the respective users. Further, the mapping table indicates that, when the number of the multiplexed users is equal to or less than a predetermined number, the Acknowledgement/Non-Acknowledgement information is associated with either the I-channel or the Q-channel, and when the number of the multiplexed users exceeds the predetermined number, the Acknowledgement/Non-Acknowledgement information is associated with the I-channel and the Q-channel.

Advantageous Effect of the Invention

According to an embodiment of the present invention, it may become possible to improve the transmission efficiency and the received quality of the Acknowledgement/Non-Acknowledgement information (ACK/NACK) indicating whether the uplink signal is required to be retransmitted.

EXPLANATION OF REFERENCES

Figure 1:
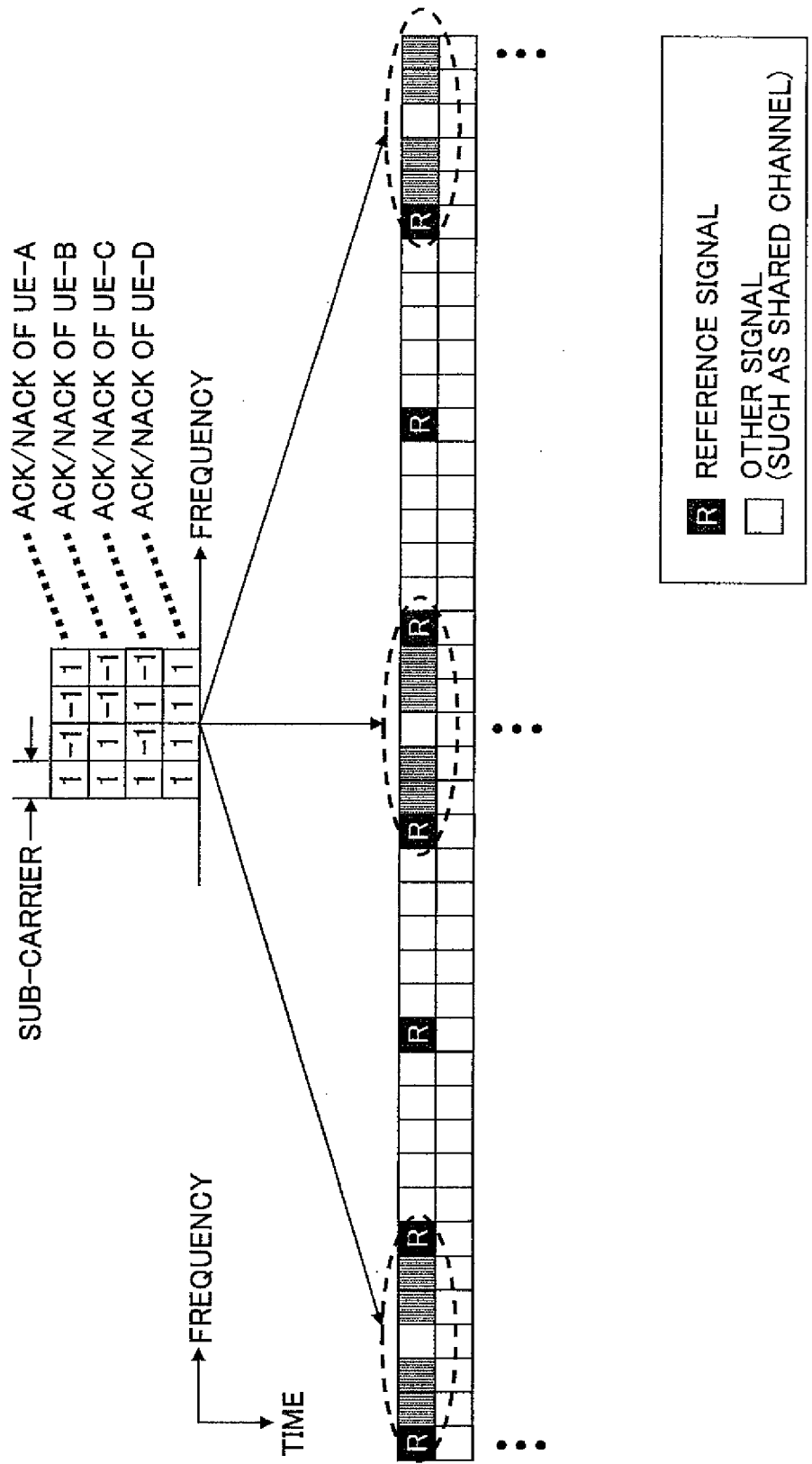
FIG. 1 is a drawing showing an example of mapping of a downlink signal.
Figure 2:
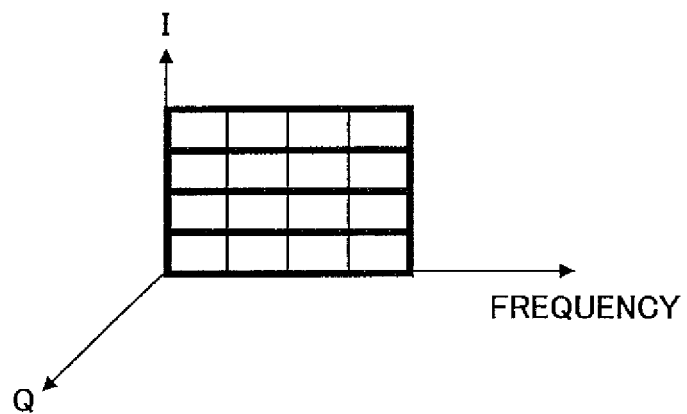
FIG. 2 is a drawing showing a state where the ACK/NACKs of four users are mapped only to the I-channel.
Figure 3:
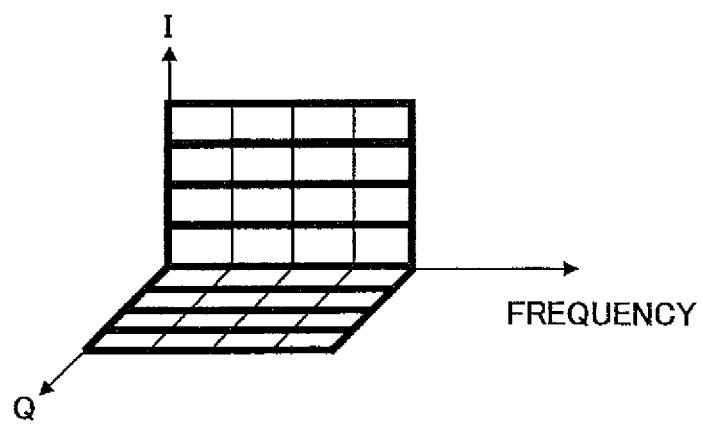
FIG. 3 is a drawing showing a state where the ACK/NACKs of eight users are mapped to the I-channel and the Q-channel.
Figure 4:
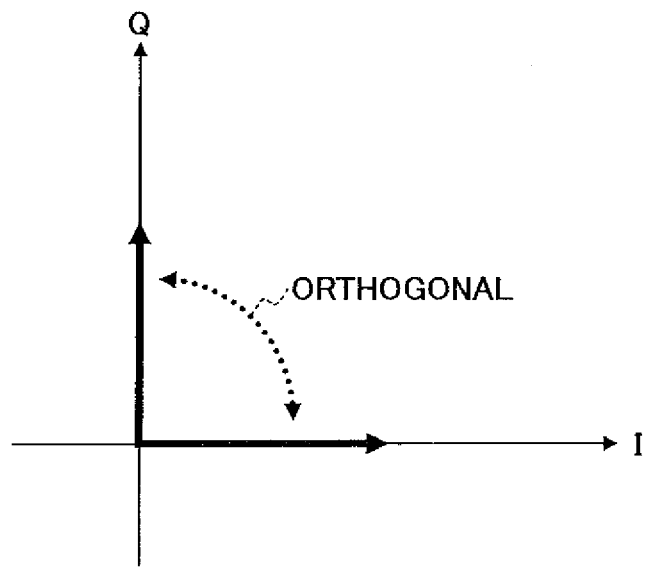
FIG. 4 is a drawing showing a state where the orthogonality between the I-channel and the Q-channel is precisely maintained.
Figure 5:
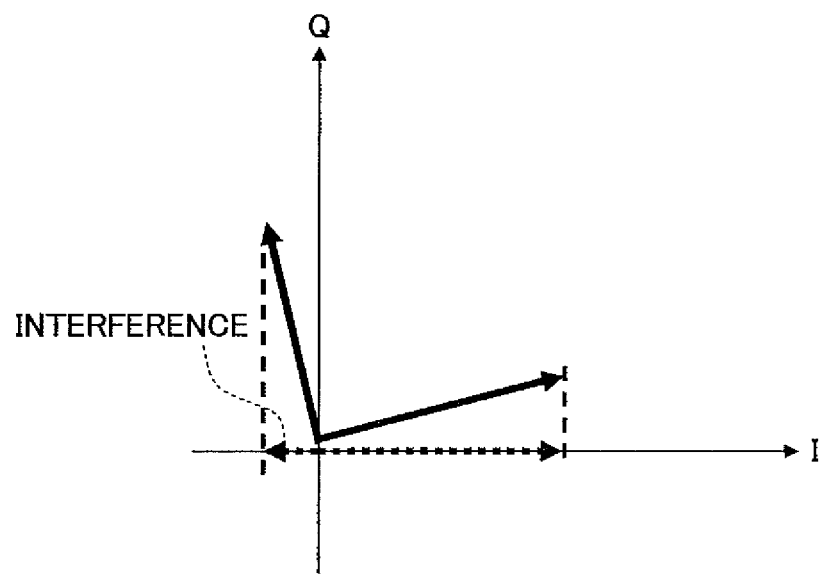
FIG. 5 is a drawing showing a state where interference arises between the I-channel and the Q-channel.

10: Scheduler
11: PDCCH Generation Section
12: PHICH Generation Section
13: PCFICH Generation Section
14: Control Channel Mapping Section
15: Mapping Table
16: PDSCH Generation Section
17: Multiplex Section
20: Signal Separation Section
21: PDCCH Demodulation Section
22: PHICH Demodulation Section
23: Mapping Table
24: PUSCH Generation Section

BEST MODE FOR CARRYING OUT THE INVENTION

According to an embodiment of the present invention, there is provided a base station apparatus used in a mobile communication system in which at least a shared data channel is transmitted by an orthogonal modulation scheme using an I-channel and a Q-channel. The base station apparatus includes a providing unit providing Acknowledgement/Non-Acknowledgement information indicating whether retransmission of a signal received in uplink is required; a mapping unit mapping a number of multiplexed users of the Acknowledgement/Non-Acknowledgement information to the I-channel or the Q-channel based on a predetermined mapping table; and a reporting unit reporting the Acknowledgement/Non-Acknowledgement information to the respective users. The mapping table indicates that, when the number of the multiplexed users is equal to or less than a predetermined number, the Acknowledgement/Non-Acknowledgement information is associated with either the I-channel or the Q-channel, and when the number of the multiplexed users exceeds the predetermined number, the Acknowledgement/Non-Acknowledgement information is associated with the I-channel and the Q-channel.

In the case where the number of the multiplexed users is equal to or less than a predetermined number, the Acknowledgement/Non-Acknowledgement information is associated with either the I-channel or the Q-channel. By doing in this way, it may become possible to improve the transmission efficiency and the received quality of the Acknowledgement/Non-Acknowledgement information when compared with a case where the Acknowledgement/Non-Acknowledgement information is associated with the I-channel and the Q-channel.

The base station apparatus may further include a scheduler providing allocation information of uplink resource blocks for each user. Further, a mapping position of the allocation information of each user in a downlink control signal may be uniquely associated with a mapping position of the Acknowledgement/Non-Acknowledgement information of the user in the I-channel or the Q-channel. This configuration may be preferable from the viewpoint of simplifying a corresponding relationship between the users and the mapping positions of the Acknowledgement/Non-Acknowledgement information without accompanying (transmitting) the respective explicit user IDs with the Acknowledgement/Non-Acknowledgement information.

Otherwise, a resource block allocated to an uplink shared channel of a user may be uniquely associated with a mapping position of the Acknowledgement/Non-Acknowledgement information of the user in the I-channel or the Q-channel. This configuration may also be preferable because the corresponding relationship between the users and the mapping positions of the Acknowledgement/Non-Acknowledgement information may be directly determined based on the positions of the resource blocks.

Preferably, when the number of the multiplexed users is equal to or less than the predetermined number, a number of resource blocks allocated to the users in uplink is restricted to an even number. This configuration may be preferable because odd-numbered or even numbered mapping positions may be simply allocated to only one of the two orthogonal modulation components.

Further, a group having a number of the Acknowledgement/Non-Acknowledgement information may be repeatedly (separately) transmitted over different frequencies including a first frequency and a second frequency within a same sub-frame, the number being equal to or less than the predetermined number, in a manner such that mapping orders of at least two of the Acknowledgement/Non-Acknowledgement information mapped to the I-channel or the Q-channel are different from each other between the group transmitted over the first frequency and the group transmitted over the second frequency. This configuration may be preferable from the viewpoint of promoting the randomization of the interference.

Further, the Acknowledgement/Non-Acknowledgement information of the users may be spread using a predetermined spreading factor, and spread Acknowledgement/Non-Acknowledgement information of plural users may be code division multiplexed in the same frequency.

According to an embodiment of the present invention, there is provided a method used in a base station apparatus for a mobile communication system in which at least a shared data channel is transmitted by the orthogonal modulation scheme using the I-channel and the Q-channel. The method includes a providing step of providing Acknowledgement/Non-Acknowledgement information indicating whether retransmission of a signal received in uplink is required; a mapping step of mapping a number of multiplexed users of the Acknowledgement/Non-Acknowledgement information to the I-channel or the Q-channel based on a predetermined mapping table; and a reporting step of reporting the Acknowledgement/Non-Acknowledgement information to the respective users. The mapping table indicates that, when a number of multiplexed users is equal to or less than a predetermined number, the Acknowledgement/Non-Acknowledgement information is associated with either the I-channel or the Q-channel, and when the number of the multiplexed users exceeds the predetermined number, the Acknowledgement/Non-Acknowledgement information is associated with the I-channel and the Q-channel.

According to an embodiment of the present invention, there is provided a user equipment terminal used in a mobile communication system in which at least a shared data channel is transmitted by the orthogonal modulation scheme using the I-channel and the Q-channel. The user equipment terminal includes a demodulation unit demodulating a downlink control signal including allocation information of uplink resource blocks; a transmission unit transmitting an uplink shared channel based on the allocation information; and an extraction unit extracting Acknowledgement/Non-Acknowledgement information from the downlink control signal based on a predetermined mapping table, the Acknowledgement/Non-Acknowledgement information indicating whether retransmission of the shared data channel is required. The mapping table indicates that, when a number of multiplexed users in the downlink control signal is equal to or less than a predetermined number, the Acknowledgement/Non-Acknowledgement information is associated with either the I-channel or the Q-channel, and when the number of the multiplexed users exceeds the predetermined number, the Acknowledgement/Non-Acknowledgement information is associated with the I-channel and the Q-channel.

According to an embodiment of the present invention, there is provided a method used in a user equipment terminal for a mobile communication system in which at least a shared data channel is transmitted by the orthogonal modulation scheme using the I-channel and the Q-channel. The method includes a demodulating step of demodulating a downlink control signal including allocation information of uplink resource blocks; a transmitting step of transmitting an uplink shared channel based on the allocation information; and an extracting step of extracting Acknowledgement/Non-Acknowledgement information from the downlink control signal based on a predetermined mapping table, the Acknowledgement/Non-Acknowledgement information indicating whether retransmission of the shared data channel is required. The mapping table indicates that, when a number of multiplexed users in the downlink control signal is equal to or less than a predetermined number, the Acknowledgement/Non-Acknowledgement information is associated with either the I-channel or the Q-channel, and when the number of the multiplexed users exceeds the predetermined number, the Acknowledgement/Non-Acknowledgement information is associated with the I-channel and the Q-channel.

In the following, an embodiment of the present invention is described from the following viewpoints:

1: Exemplary operation using a mapping position of control information
2: Exemplary operation using a mapping position of resource block numbers
3. Operation example where order is changed
4. Base station apparatus (eNB)
5. User equipment (UE) terminal Embodiment 1

1: Operation Example Using a Mapping Position of Control Information (First Operation Example)

Figure 6:
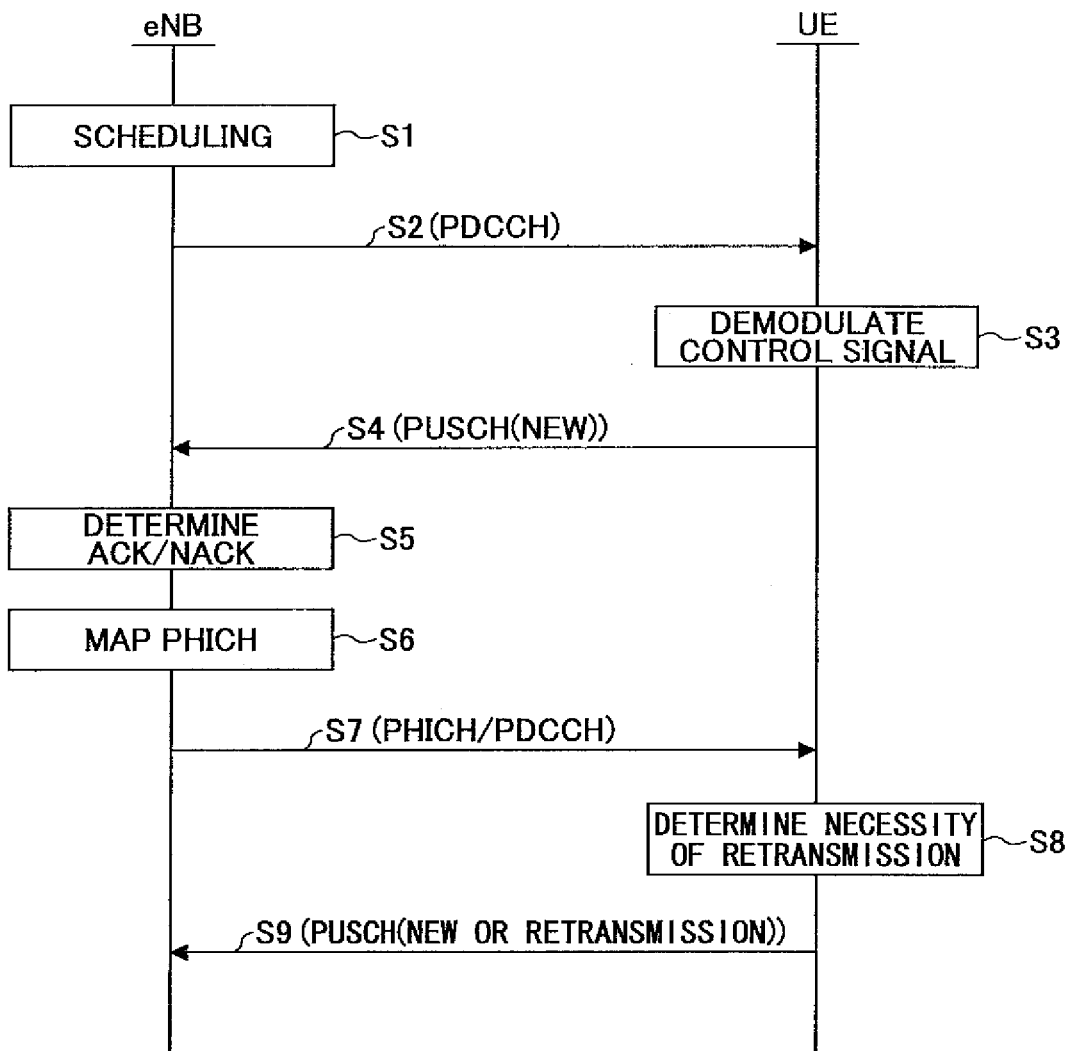
FIG. 6 is a sequential diagram showing an exemplary process according to an embodiment of the present invention.

FIG. 6 is a sequence diagram showing an exemplary operation according to an embodiment of the present invention. As shown in FIG. 6, in step S1, the base station (eNB) performs a scheduling process to allocate radio resources in downlink and uplink. The information indicating how the radio resources are allocated in downlink and uplink is indicated in the Downlink Scheduling information and the Uplink Scheduling-Grant, respectively. The Downlink Scheduling Information and the Uplink Scheduling Grant are included in the Physical Downlink Control CHannel (PDCCH).

In this operation example, a mobile communication system using the SC-FDMA scheme in uplink is used. Therefore, when plural resource blocks are allocated to a single user, the scheduling process is controlled in a manner such that the plural resource blocks occupy consecutive frequency bands. However, when a multi-carrier scheme such as the OFDM scheme is used, such control is not required.

In step S2, the base station apparatus (eNB) transmits a downlink control signal and the Physical Downlink Shared CHannel (PDSCH) to the user equipment (UE) terminal, the downlink control signal including at least the PCFICH and the PDCCH.

In step S3, the user equipment (UE) terminal demodulates the downlink control signal. By reading the Physical Control Format Indicator CHannel (PCFICH), the user equipment (UE) terminal detects, for example, the number of OFDM symbols allocated to the PDSCH within one sub-frame, and which is the first OFDM symbol of the OFDM symbols allocated to the PDSCH and the like. The user equipment (UE) terminal determines whether the PDSCH addressed to the user equipment (UE) terminal is included in the received PDCCHs. Generally, the PDCCHs of plural users are multiplexed in the downlink control signal. For explanatory purposes, herein, the number of multiplexed users is expressed as "N" so that N PDCCHs are expressed by PDCCH-1, PDCCH-2, . . . , PDCCH-N. The downlink control signal includes N PDCCH information blocks. When downlink/uplink radio resources are allocated to the user equipment (UE) terminal, any of the N information locks is the PDCCH addressed to the user equipment (UE) terminal.

The user equipment (UE) terminal sequentially demodulates from the first information block of the N information blocks. The user equipment (UE) terminal may determine whether the PDSCH addressed to the user equipment (UE) terminal is included by determining, for example, the user ID convolved in the CRC for the information blocks. When determining that x-th information block is addressed to the user equipment (UE) terminal, the user equipment (UE) extracts the scheduling information addressed to the user equipment (UE) terminal from the information block PDCCH-x. On the other hand, as a result of demodulation of the N information block, when there is no information block addressed to the user equipment (UE) terminal, no resource blocks are allocated to the user equipment (UE) terminal.

Figure 7:
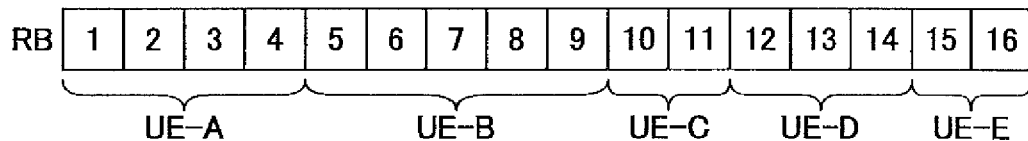
FIG. 7 is a drawing showing an example of allocation of resource blocks in uplink.

FIG. 7 shows a case where the number of multiplexed users is five (N=5) and the uplink radio resources are allocates as follows:

PDCCH-1: UE-A;RB1;4
PDCCH-2: UE-B;RB5;5
PDCCH-3: UE-C;RB10;2
PDCCH-4: UE-D;RB12;3
PDCCH-5: UE-E;RB15;2

Four resource blocks RB1 through RB4 are allocated to the user equipment (UE) A (UE-A).

Five resource blocks RB5 through RB9 are allocated to the user equipment (UE) B (UE-B).

Two resource blocks RB10 and RB11 are allocated to the user equipment (UE) C (UE-C).

Three resource blocks RB12 through RB14 are allocated to the user equipment (UE) D (UE-D).

Two resource blocks RB15 and RB16 are allocated to the user equipment (UE) E (UE-E).

The number of multiplexed users and the number of resource blocks described above are examples only. Namely, any other adequate numbers may alternatively be used.

In step S4 of FIG. 6, the user equipment (UE) terminals transmit the Physical Uplink Shared Channel (PUSCH) using the respective resource blocks based on the Uplink Scheduling Information.

In step S5, the base station apparatus (eNB) receives the PUSCHs from the user equipment (UE) terminals and determines whether the retransmission is required for each PUSCH. Whether the retransmission is required may be determined based on, for example, an error detection result of the PUSCH. When determining that retransmission is not required, the base station apparatus (eNB) provides Acknowledgement information (ACK) On the other hand, when determining that retransmission is required, the base station apparatus (eNB) provides Non-Acknowledgement information (NACK). The Acknowledgement/Non-Acknowledgement information (ACK/NACK) is provided for each user having transmitted the PUSCH. The Acknowledgement/Non-Acknowledgement information (ACK/NACK) is reported to each user as a Physical Hybrid Indicator CHannel (PHICH) in the downlink control signal. In the present example, five users (user equipment (UE) terminals) transmit the PUSCH; therefore, the Acknowledgement/Non-Acknowledgement information (ACK/NACK) for each of the five users is provided. Herein, for convenience, those PHICHs are expressed as PHICH-1, PHICH-2, ..., and PHICH-5. Therefore, the PHICHs of five users are included in the downlink control signal.

It is necessary for each user (user equipment (UE) terminal) to extract the PHICH addressed to the user equipment (UE) terminal from the downlink control signal. In this case, it may be thought that the PHICH-1~5 accompany the respective user identification information. However, this may not be preferable from the viewpoint of the transmission efficiency of information. This is because a large number of bits may be required to express the user ID while the number of bits for the PHICH is extremely small. Therefore, in this embodiment, it is not allowed for any explicit user ID to accompany PHICH. Alternatively, the mapping of the PHICH in the downlink control signal is well arranged so that the user equipment (UE) terminal can appropriately extract the PHICH addressed to the user equipment (UE) terminal.

In step S6, the PHICH-1~5 of the users are mapped to the downlink control signal based on a predetermined mapping table. The corresponding relationship between the PHICH-1~5 and the UE-A-E is specified via the PDCCH-1~5. For example, as described in step 3, the information of the UE-A is included in the first information block (PDCCH-1); therefore, the PHICH addressed to the UE-A corresponds to the first PHICH (PHICH-1). Further, the information of the UE-B is included in the second information block (PDCCH-2); therefore, the PHICH addressed to the UE-B corresponds to the second PHICH (PHICH-2). In the same manner, the PHICH addressed to the UE-C corresponds to the PHICH-3; the PHICH addressed to the UE-D corresponds to the PHICH-4; and PHICH addressed to the UE-E corresponds to the PHICH-5.

In this embodiment, when determining that the number of multiplexed users is equal to or less than a predetermined number, the PHICHs of the users are mapped to only the I-channel. On the other hand, when determining that the number of multiplexed users exceeds the predetermined number, the predetermined number of the PHICHs are mapped to the I-channel, and the rest of the PHICHs are mapped to the Q-channel. Typically, the predetermine number is half of the maximum number of multiplexed users that can transmit the respective PUSCHs at the same time.

Figure 8:
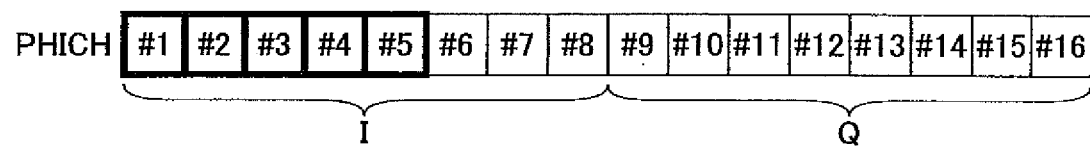
FIG. 8 is a drawing showing a corresponding relationship between PHICH-1~16 and orthogonal modulation components.

FIG. 8 schematically shows a state where the PHICH-1~8 are mapped to the I-channel and the PHICH-9~16 are mapped to the Q-channel. For example, when the number of multiplexed users is five, all the PHICH-1~5 are mapped to the I-channel; and in this case, the Q-channel is not used. In the example of FIG. 8, the number (16) of the resource blocks is equal to the maximum number of multiplexed users (16) of the PHICHs. However, the present invention is not limited to this configuration as long as the maximum number of multiplexed users of the PUSCHs is equal to the maximum number of multiplexed users of the PHICHs.

Figure 9:
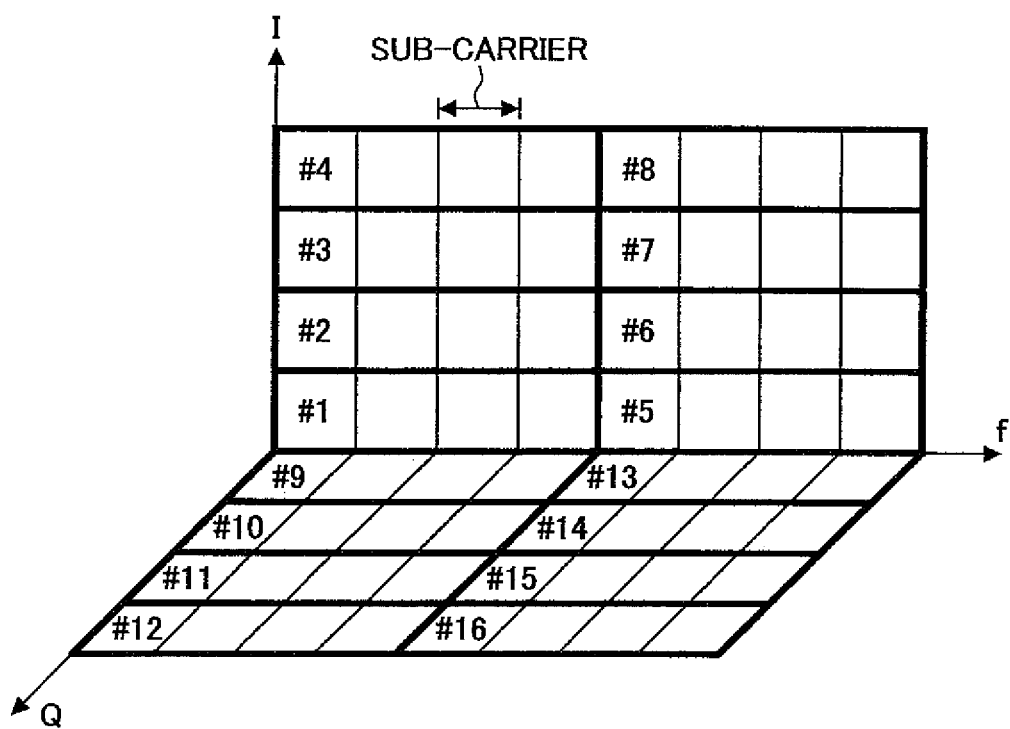
FIG. 9 is a drawing showing an example of an appropriate mapping position of the PHICH when the mapping position of a control channel is used.

FIG. 9 shows an example how the PHICH-1~16 in FIG. 8 are associated with the I-channel and the Q-channel. As shown in FIG. 9, the PHICH-1~4 are code division multiplexed on four sub-carriers 1~4, and PHICH-5~8 are code division multiplexed on other four sub-carriers 5~8; and all the PHICH-1~-8 are mapped to the I-channel. It is assumed that the spreading factor (SF) is four (SF=4). On the other hand, the PHICH-9~12 are code division multiplexed on four sub-carriers 1~4, and PHICH-13~16 are code division multiplexed on other four sub-carriers 5~8; but all the PHICH-9~16 are mapped to the Q-channel. In practical communications, however, as many as 16 PHICHs are not always necessary. There may be a case where the number of multiplexed users is equal to or less than eight. In such a case, eight or less PHICHs are mapped only to the I-channel. Therefore, in this case, the Q-channel is not used. In the present example, there are provided five PHICHs, and those PHICHs are mapped to spots #1~#5 and only the I-channel is used. In this case, each "spot" (place to be allocated) uniquely specifies whether the I-channel or the Q-channel is used, which of the four parts of the Spreading Factor (SF) is used, and which of the sub-carriers 1~4 and 5~8 are used.

In the example of FIG. 9, the maximum number of multiplexed users is 16. However, any other appropriate number may alternatively be used. When the maximum number of multiplexed users differs depending on cells, it is assumed that the system provides the mapping patterns of the PHICHs for the maximum number of multiplexed users and that all of the mapping patterns are stored in all the user equipment (UE) terminals in advance. The maximum number of multiplexed users is reported using broadcast information or the like. Therefore, by reading the broadcast information, the user equipment (UE) determines which mapping pattern is used in the cell where the user equipment (UE) terminal is located.

In step S7 of FIG. 6, the PHICHs (in the above case, PHICH-1~5) mapped to the spots as shown in FIG. 9 are transmitted to the respective users.

In step S8, by using the above-described mapping table, each user equipment (UE) terminal reads the PHICH related (addressed) to the user equipment (UE) terminal from the downlink control signal. The downlink control signal in this case includes not only the PCFICH and the PDCCH but also the PHICH. Each user equipment (UE) terminal has detected the mapping position of the PDCCH addressed to the user equipment (UE) terminal in step S3. When determining that the PDCCH addressed to the user equipment (UE) terminal is mapped to the x-th PDCCH, the Acknowledgement/Non-Acknowledgement information (ACK/NACK) of the user has been written in the x-th PHICH (i.e., PHICH-x). Because of this feature, the user equipment (UE) terminal A (UE-A) determines whether the retransmission is required by reading the information in PHICH-1.

The user equipment (UE) terminal B (UE-B) determines whether the retransmission is required by reading the information in PHICH-2.

The user equipment (UE) terminal C (UE-C) determines whether the retransmission is required by reading the information in PHICH-3.

The user equipment (UE) terminal D (UE-D) determines whether the retransmission is required by reading the information in PHICH-4.

The user equipment (UE) terminal E (UE-E) determines whether the retransmission is required by reading the information in PHICH-5.

When determining that the retransmission is not required, a not-yet-transmitted (new) PUSCH is transmitted in step S9. The radio resources to be used for the transmission of the new PUSCH are designated in the Uplink Scheduling Grant in the PDCCH reported in step S7. On the other hand, when determining that the retransmission is required, the same PUSCH transmitted in step S4 is retransmitted in step S9. In this case, the radio resources to be used for the retransmission may be separately determined from the case of the transmission of the new packet data, or may be reported in every retransmission case using the Uplink Scheduling Grant similar to the case of the transmission of the new packet data.

In this operation example, in the case where the maximum number of multiplexed users is 16, if the number of multiplexed users is equal to or less than eight, all the PHICHs are mapped only to either the I-channel or the Q-channel. By doing in this way, it may become possible to improve the transmission efficiency and the received quality of the PHICH.

Figure 10:
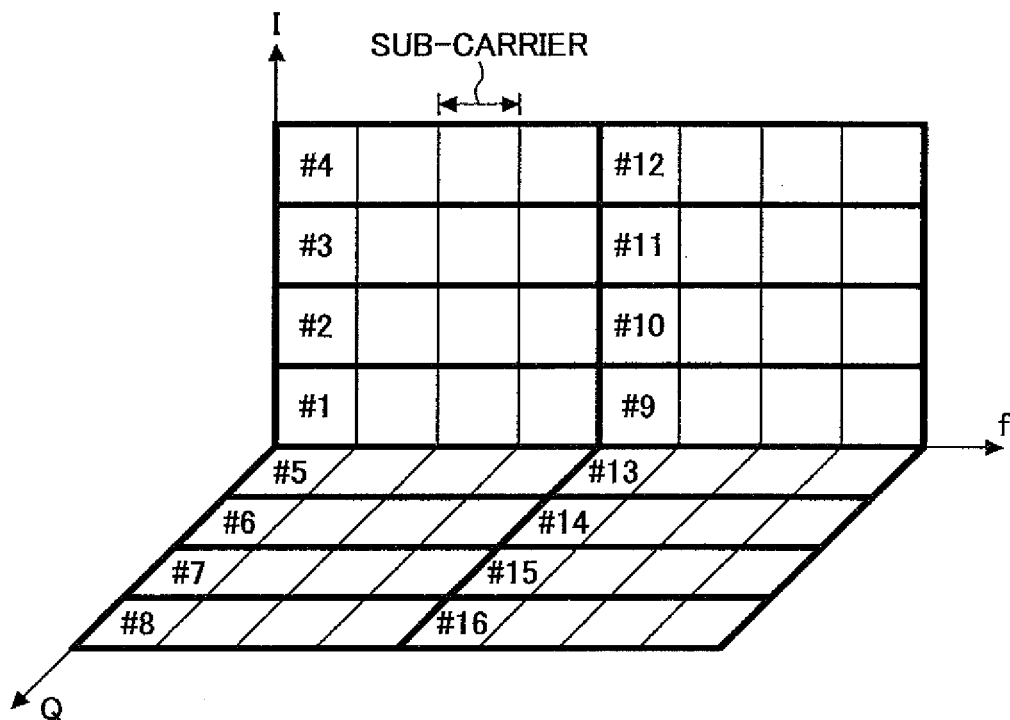
FIG. 10 is a drawing showing an example of an inappropriate mapping position of the PHICH when the mapping position of control channel is used.

In the example of FIG. 9, a case is described where the PHICHs are mapped to the I-channel first. However, the mapping table may be provided so that the PHICHs may be mapped to the Q-channel first. The mapping method of the PHICHs is not limited to the configuration as shown in FIG. 9, and any other appropriate mapping method may alternatively used. However, it should be noted that when the PHICHs are mapped in the increasing order from #1, if the PHICHs of the first four users are mapped to the I-channel and the PHICHs of the next four users are mapped to the Q-channel as shown in FIG. 10, the above advantages may not be obtained. Therefore, more generally, it is required that all the x-th PHICHs (where x is equal to or less than the half of the maximum number of multiplexed users) (in this case, x=8) are mapped only to one of the two orthogonal modulation components (for example, I-channel only).

2: Operation Example Using a Mapping Position of Resource Block Number (Second Operation Example)

The operation example described below is performed based on the sequence diagram (steps) similar to that in FIG. 6. Therefore, the steps of this operation example are sequentially described. However, this second operation example differs from the first operation example described above in the allocation method of resource blocks (in step S1), the mapping table (in step S6), and the process performed by the user equipment (UE) terminal (in step S8).

In step S1, the base station (eNB) performs a scheduling process to allocate radio resources in downlink and uplink.

In this operation example as well, a mobile communication system using the SC-FDMA scheme in uplink is used. Therefore, when plural resource blocks are allocated to a single user, the scheduling process is controlled so that the plural resource blocks occupy consecutive frequency bands. In addition, in this operation example, it is determined whether the number of multiplexed users in the downlink control signal is equal to or less than a predetermined number. When determining that the number of multiplexed users in the downlink control signal is equal to or less than a predetermined number (typically, when the number of multiplexed users is equal to or less than the half of the maximum number of multiplexed users), the number of resource blocks to be allocated to the users is restricted to an even number. On the other hand, when determining that the number of multiplexed users exceeds the predetermined number, the number of resource blocks to be allocated to the users may be any of an odd number and an even number. In this regard, this process in which the number of the resource blocks is restricted or not depending on the number of multiplexed users largely differs from that in the first operation example.

In step S2, the base station apparatus (eNB) transmits a downlink control signal and the Physical Downlink Shared CHannel (PDSCH) to the user equipment (UE) terminal, the downlink control signal including at least the PCFICH and the PDCCH.

In step S3, the user equipment (UE) terminal demodulates the downlink control signal. The user equipment (UE) terminal determines whether the PDSCH addressed to the user equipment (UE) terminal is included in the received PDCCHs. When determining that the PDSCH addressed to the user equipment (UE) terminal is included, the user equipment (UE) terminal prepares the communication using the allocated resource blocks.

Figure 11:
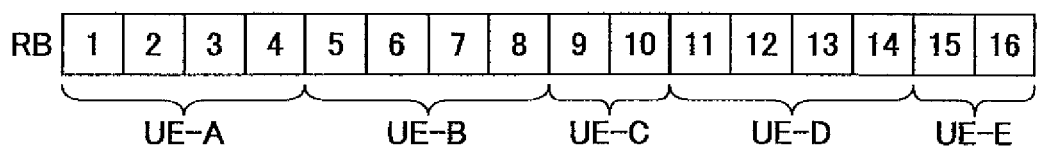
FIG. 11 is a drawing showing another example of the allocation of the resource blocks in uplink.

FIG. 11 shows an example of the allocation of the uplink resource blocks designated by the PDCCH. In this example of FIG. 11, the number of multiplexed users (UE-A~E) is five which is less than eight (which is the half of the maximum number of multiplexed users) (5≤8). Therefore, the number of resource blocks to be allocated to the users is restricted to an even number.

Four resource blocks RB1 through RB4 are allocated to the user equipment (UE) terminal A (UE-A).

Four resource blocks RB5 through RB8 are allocated to the user equipment (UE) B (UE-B).

Two resource blocks RB9 and RB10 are allocated to the user equipment (UE) C (UE-C).

Four resource blocks RB11 through RB14 are allocated to the user equipment (UE) D (UE-D).

Two resource blocks RB15 and RB16 are allocated to the user equipment (UE) E (UE-E).

In step S4, the user equipment (UE) terminals transmit the Physical Uplink Shared Channels (PUSCHs) using the resource blocks as shown in FIG. 11 based on the Uplink Scheduling Information.

In step S5, the base station apparatus (eNB) receives the PUSCHs from the user equipment (UE) terminals and determines whether the retransmission is required for each PUSCH. Whether the retransmission is required may be determined based on, for example, an error detection result of the PUSCH. When determining that retransmission is not required, the base station apparatus (eNB) provides Acknowledgement information (ACK). On the other hand, when determining that retransmission is required, the base station apparatus (eNB) provides Non-Acknowledgement information (NACK). The Acknowledgement/Non-Acknowledgement information (ACK/NACK) is provided for each user having transmitted the PUSCH. In the present example, five users (user equipment (UE) terminals) transmit the PUSCH; therefore, the Acknowledgement/Non-Acknowledgement information (ACK/NACK) for each of the five users is provided.

In step S6, the PHICHs of the users are mapped to the downlink control signal based on a predetermined mapping table. The corresponding relationship between the PHICHs of the five users and the UE-A~E is distinguished by the resource blocks of the Physical Uplink Shared Channel (PUSCH). In this regard, this second operation example differs from the first operation example. In the present example, the resource blocks are allocated as shown in FIG. 11. The spots (places to be allocated) for the PHICHs may be secured up to the total amount of the resource blocks. The resource blocks from RB1 are sequentially allocated to the UE-A; therefore, the Acknowledgement/Non-Acknowledgement information (ACK/NACK) of the UE-A is written into the first spot of the PHICH (i.e., PHICH-1). The resource blocks from RB5 are sequentially allocated to the UE-B; therefore, the Acknowledgement/Non-Acknowledgement information (ACK/NACK) of the UE-B is written into the fifth spot of the PHICH (i.e., PHICH-5). In the same manner, the Acknowledgement/Non-Acknowledgement information (ACK/NACK) of the UE-C is written into the ninth spot of the PHICH (i.e., PHICH-9). The Acknowledgement/Non-Acknowledgement information (ACK/NACK) of the UE-D is written into the eleventh spot of the PHICH (i.e., PHICH-11). The Acknowledgement/Non-Acknowledgement information (ACK/NACK) of the UE-E is written into the fifteenth spot of the PHICH (i.e., PHICH-15.

Figure 12:
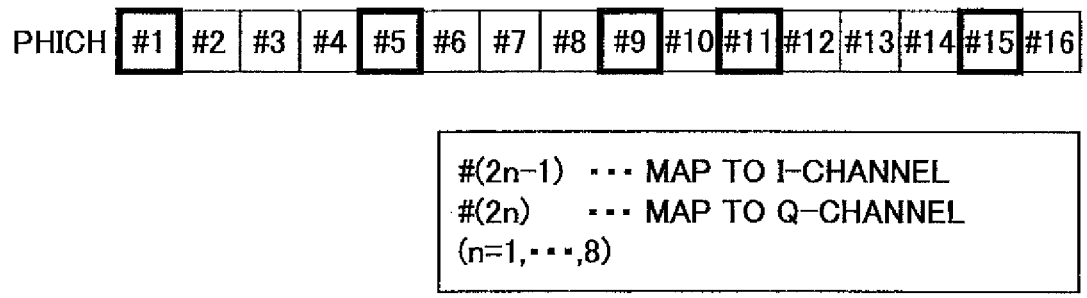
FIG. 12 is drawing showing another corresponding relationship between PHICH-1~16 and orthogonal modulation components.

FIG. 12 shows a corresponding relationship between the spots of the PHICHs and the orthogonal modulation components. In this operation example, odd-numbered PHICHs are mapped to the I-channel and even-numbered PHICHs are mapped to the Q-channel. When the number of multiplexed users is equal to or less than eight and accordingly, an even number of the resource blocks are always allocated, an even number of the resource blocks starting from an odd-numbered resource block is always allocated to the users. In this example, the resource blocks starting from the first, the fifth, the ninth, the eleventh, and the fifteenth resource blocks are allocated. Therefore, by setting the above-described arrangement as shown in FIG. 12, it may become possible to map all the PHICHs of the users to the I-channel only.

Figure 13:
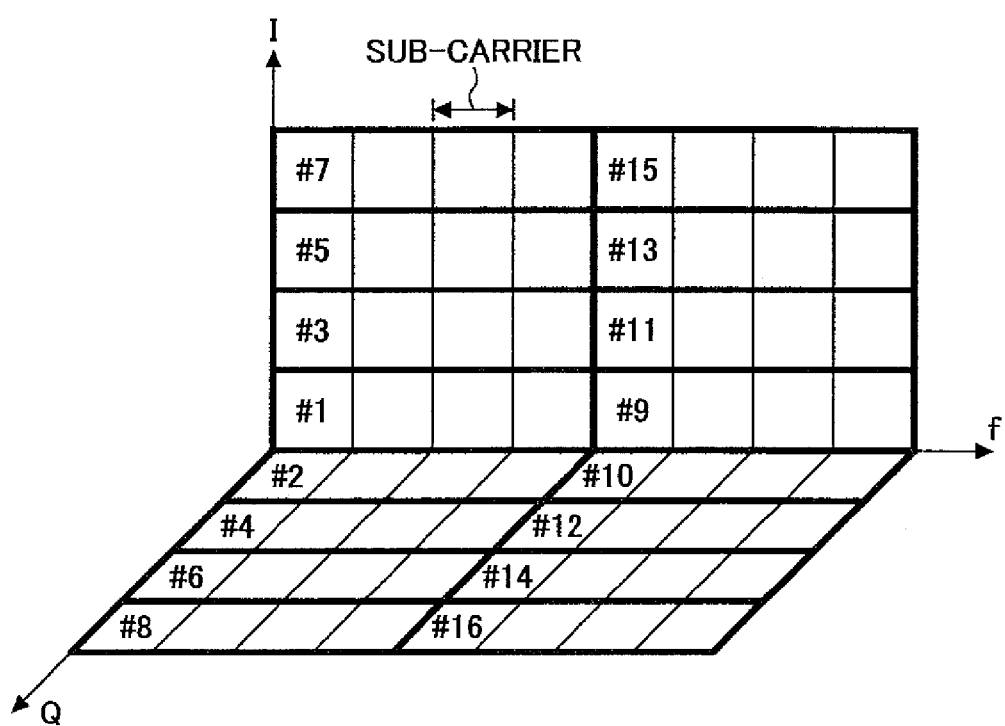
FIG. 13 is a drawing showing an example of an appropriate mapping position of the PHICH when the mapping position of the resource blocks is used.

FIG. 13 shows an example how the PHICH-1~16 in FIG. 12 are associated with the I-channel and the Q-channel. As shown in FIG. 13, the PHICH-1, PHICH-3, PHICH-5, and PHICH-7 are code division multiplexed on four sub-carriers 1~4, and PHICH-9, PHICH-11, PHICH-13, and PHICH-15 are code division multiplexed on other four sub-carriers 5~8; and all the PHICHs are mapped to the I-channel. It is assumed that the Spreading Factor (SF) is four (SF=4). On the other hand, the PHICH-2, PHICH-4, PHICH-6, and PHICH-8 are code division multiplexed on four sub-carriers 1~4, and PHICH-10, PHICH-12, PHICH-14, and PHICH-16 are code division multiplexed on other four sub-carriers 5~8; but all the PHICHs are mapped to the Q-channel.

In practical communications, however, as many as 16 PHICHs may not be always necessary. There may be a case where the number of multiplexed users is equal to or less than eight. In such a case, eight or less PHICHs are mapped only to the I-channel. Therefore, in this case, the Q-channel is not used. In the present example, there are provided five PHICHs, and those PHICHs are mapped to spots #1, #5, #9, #11, and #15 and only the I-channel is used. In this case as well, each "spot" uniquely specifies whether the I-channel or the Q-channel is used, which of the four parts of the Spreading Factor (SF) is used, and which of the sub-carriers 1~4 and 5~8 is used.

In the example of FIG. 13, a case is described where the maximum number of multiplexed users is 16. However, similar to the first operation example, any other appropriate number may alternatively be used. Further, a case is described where the resource blocks are distinguished by using the numbers 1 through 16. However, alternatively, the resource blocks may be distinguished by using the numbers 0 through 15. In this case, it should be noted that the relationships using the odd numbers and the even numbers described above should be reversed. However, it should be maintained that the number of resource blocks to be allocated to the users is restricted to an even number when determining that the number of multiplexed users is equal to or less than a predetermined number. Further, in the above description, the odd numbers and the even numbers are associated with the I-channel and the Q-channel, respectively. However, alternatively, the odd numbers and the even numbers may be associated with the Q-channel and the I-channel, respectively. Further, in FIG. 9, it is expected (assumed) that a predetermined number of consecutive numbers are mapped only to one of the two orthogonal modulation components, and actually, the same number of PHICHs as the number of multiplexed users are mapped in the increasing order (see FIG. 9). In contrast, in FIG. 13, it is expected (assumed) that a predetermined number of alternate numbers are mapped only to one of the two orthogonal modulation components. Therefore, in an actual case, it should be noted that the same number of PHICHs as the number of multiplexed users may not necessarily be mapped in a consecutive order (as shown in FIG. 13).

In step S7, the PHICHs (in the above case, PHICH-1, PHICH-5, PHICH-9, PHICH-11, and PHICH-15) mapped to the spots as shown in FIG. 13 are transmitted to the respective users.

In step S8, by using the above-described mapping table, each user equipment (UE) terminal reads the PHICH related (addressed) to the user equipment (UE) terminal from the downlink control signal. The downlink control signal in this case includes not only the PCFICH and the PDCCH but also the PHICH. Each user equipment (UE) terminal has detected which resource block is used to transmit the PUSCH in step S4. When determining that the PUSCH is transmitted using the x-th or subsequent resource block, the Acknowledgement/Non-Acknowledgement information (ACK/NACK) of the user is written in the x-th PHICH (i.e., PHICH-x). Because of this feature, the user equipment (UE) terminal (UE-A) determines whether the retransmission is required by reading the information in PHICH-1.

The user equipment (UE) terminal (UE-B) determines whether the retransmission is required by reading the information in PHICH-5.

The user equipment (UE) terminal (UE-C) determines whether the retransmission is required by reading the information in PHICH-9.

The user equipment (UE) terminal (UE-D) determines whether the retransmission is required by reading the information in PHICH-11.

The user equipment (UE) terminal (UE-E) determines whether the retransmission is required by reading the information in PHICH-15.

When determining that the retransmission is not required, a not-yet-transmitted (new) PUSCH is transmitted in step S9. The radio resource to be used for the transmission of the new PUSCH is designated in the Uplink Scheduling Grant in the PDCCH reported in step S7. On the other hand, when determining that the retransmission is required, the same PUSCH transmitted in step S4 is retransmitted in step S9. In this case, the radio resource to be used for the retransmission may be separately determined from the case of the transmission of the new packet data, or may be reported in every retransmission case using the Uplink Scheduling Grant similar to the transmission of the new packet data.

In this operation example, in the case where the maximum the number of multiplexed users is 16, if the number of multiplexed users is equal to or less than eight, all the PHICHs are mapped only to either the I-channel or the Q-channel. By doing in this way, it may become possible to improve the transmission efficiency and the received quality of the PHICH. However, in this operation example, when determining that the number of multiplexed users is equal to or less than a predetermined number, the scheduling process is controlled so that the number of resource blocks to be allocated to the users is restricted to an even number. This configuration may narrow the degree of freedom in the scheduling process. However, the maximum degree of freedom restricted in the scheduling process is limited to one resource block only. Therefore, by improving the transmission efficiency and the received quality of the PHICH, it may become possible to eventually obtain more benefits.

3. Operation Example where Order is Changed

As described with reference to FIG. 1, from the viewpoint of improving the reliability, the PHICHs of the four users are mapped to three different regions on the frequency axis, and transmitted at the same time using different respective frequencies. The PHICHs of the users are spread using a predetermined Spreading Factor (SF) (e.g. SF=4) and code division multiplexed on four sub-carriers. In this case, the allocation order of the PHICHs within one region (group) may be the same as that within two other regions (groups). Alternatively, the allocation order of the PHICHs within one region (group) among the three regions (groups) may be different from each other. From the viewpoint of improving the reliability, it may be preferable to variably change the allocation order of the PHICHs among the regions (groups).

Figure 14:
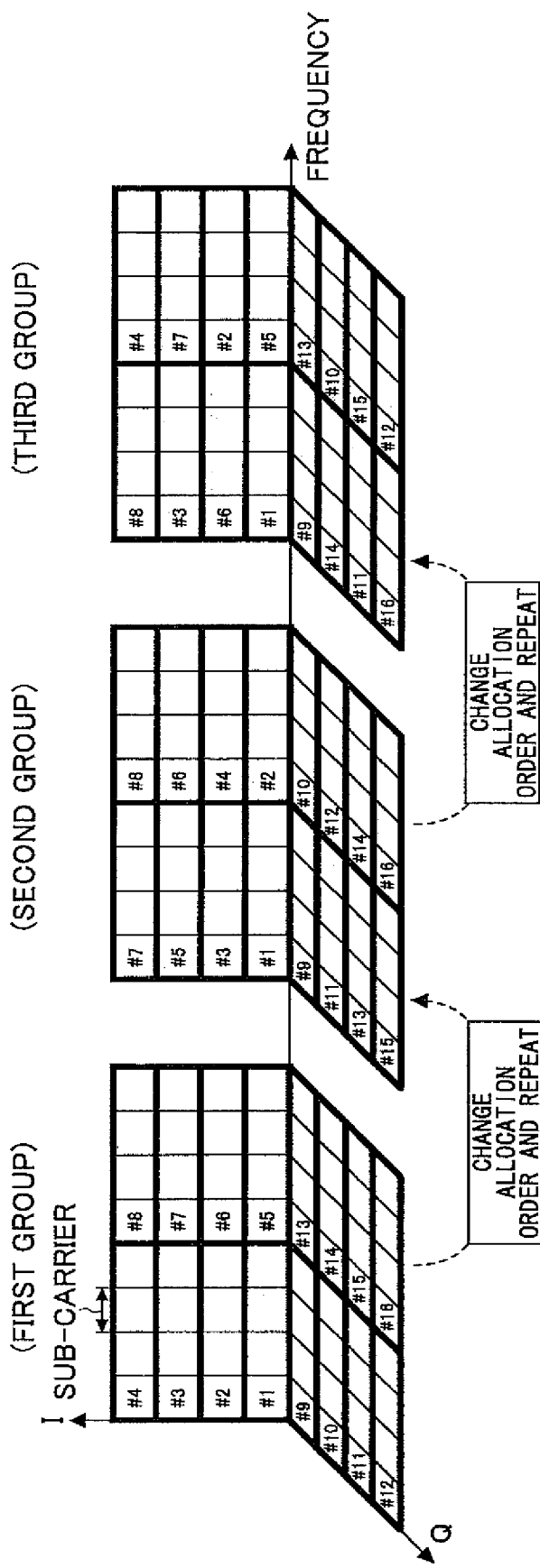
FIG. 14 is a drawing showing an example where the PHICHs of 16 users are mapped in three different orders.

FIG. 14 shows an example where the allocation spots of the PHICHs of the sixteen users are different from each other among three different regions on the frequency axis. When the orthogonality is disturbed, the interference especially within the same frequency region is likely to increase.

For example, in FIG. 14, when the orthogonality in the first group (region) is disturbed, the interference especially between the spots #1, #2, #3, and #4 and the spots #9, #10, #11, and #12 and between the spots #5, #6, #7, and #8 and the spots #13, #14, #15, and #16 are likely to increase.

When the orthogonality in the second group (region) is disturbed, the interference especially between the spots #1, #3, #5, and #7 and the spots #9, #11, #13, and #15 and between the spots #2, #4, #6, and #8 and the spots #10, #12, #14, and #16 are likely to increase.

When the orthogonality in the third group (region) is disturbed, the interference especially between the spots #1, #6, #3, and #8 and the spots #9, #14, #11, and #16 and between the spots #5, #2, #7, and #4 and the spots #13, #10, #15, and #12 are likely to increase.

However, in this case, the combination of the spots where the interference increases differs among those three groups (regions). Because of this feature, by changing the allocation order as described above, when disturbance of orthogonality causes the interference, the interference may be randomized; thereby better controlling to some extent the degradation of the quality of the PHHICHs caused by disturbance of orthogonality.

In the example of FIG. 14, in any of the three groups, the numbers #1 through #B belong to the I-channel and the numbers #9 through #16 belong to the Q-channel. In order to randomize the interference caused by the disturbance of the orthogonality and the allocation spots of the PHICHs, the allocation order may be changed among the I-channel and the Q-channel without a restriction to be changed within the I-channel or the Q-channel only in each of the three groups (regions). However, as described in the first and second operation examples, it is required that when the number of multiplexed users is equal to or less than the half of the maximum number of multiplexed users, all the PHICHs be mapped to either the I-channel or the Q-channel. Therefore, to obtain a combined effect due to the first or second operation example and this operation example where the order is changed, it may be preferable as shown in FIG. 14, that the allocation order be changed within one of the two orthogonal modulation components only. Further, in the example of FIG. 14, consecutive numbers #1 through #8 are allocated to the I-channel. However, when the second operation example is to be applied to this example, the numbers #1 through #8 may be replaced by eight odd numbers and the numbers #9 through #16 may be replaced by eight even numbers.

4. Base Station Apparatus (eNB)

Figure 15:
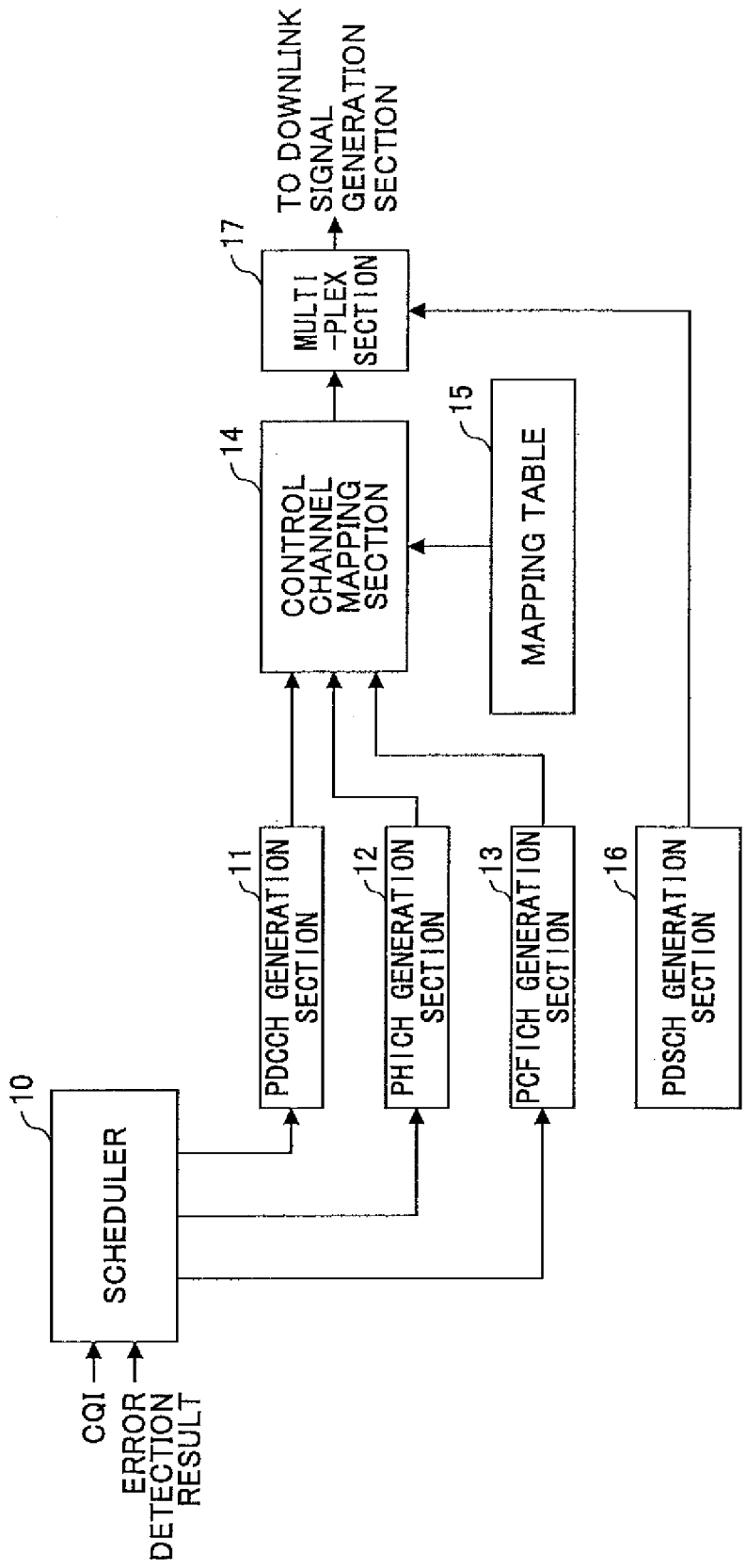
FIG. 15 is a partial block diagram of a base station apparatus according to an embodiment of the present invention.

FIG. 15 is a partial functional block diagram of the base station apparatus (eNB) according to an embodiment of the present invention. As shown in FIG. 15, the base station apparatus (eNB) includes a scheduler 10, a PDCCH generation section 11, a PDICH generation section 12, a PCFICH generation section 13, a control channel mapping section 14, a mapping table 15, a PDSCH generation section 16, and a multiplex section 17.

The scheduler 10 performs the scheduling process to determine the schedule of the allocation of the uplink and downlink radio resources. The scheduling process may be performed depending on the radio propagation status and the like. The radio propagation status may be measured based on the downlink CQIs reported from the user equipment (UE) terminals, the SINR (Signal-to-Interference and Noise power Ratio) measured in uplink and the like. Further, the radio propagation status may influence the error detection result; therefore, the error detection result may further be considered in the scheduling process.

The PDCCH generation section 11 generates the Physical Downlink Control CHannel (PDCCH) including information items such as the Downlink Scheduling Information and the Uplink Scheduling Grant.

The PHICH generation section 12 provides the Acknowledgement/Non-Acknowledgement information (ACK/NACK) to be transmitted to each user having transmitted the Physical Uplink Shared CHannel (PDSCH). The Acknowledgement/Non-Acknowledgement information (ACK/NACK) is expressed in either the Non-Acknowledgement information (NACK) which requests for the retransmission of the PUSCH or the Acknowledgement information (ACK) which does not request for the retransmission of the PUSCH. The PHICHs of the users are code spread using a predetermined Spreading Factor (SF).

The PCFICH generation section 13 indicates the number of OFDM symbols used for the PDCCH within the sub-frames. Typically, the number of the OFDM symbols is one, two, or three and varies depending on the number of multiplexed users.

The control channel mapping section 14 maps the downlink control signal on an appropriate frequency, the downlink control signal including the PDCCH, the PHICH, the PCFICH and the like. As described above, the PHICHs of a predetermined number of the users are code division multiplexed on the same sub-carriers.

The mapping table 15 indicates how the PHICHs of the users are associated with the I-channel and/or the Q-channel.

The PDSCH generation section 16 provides the Physical Downlink Shared CHannel (PDSCH).

The multiplex section 17 multiplexes the downlink control channel and the PDSCH, and transmits the multiplexed signal to a downlink signal generation section (not shown) provided on the downstream side thereof. The downlink signal generation section generates the transmission symbols modulated by the OFDM scheme. The multiplex section 17 further multiplexes a reference signal on an as-needed basis.

5. User Equipment (UE) Terminal

Figure 16:
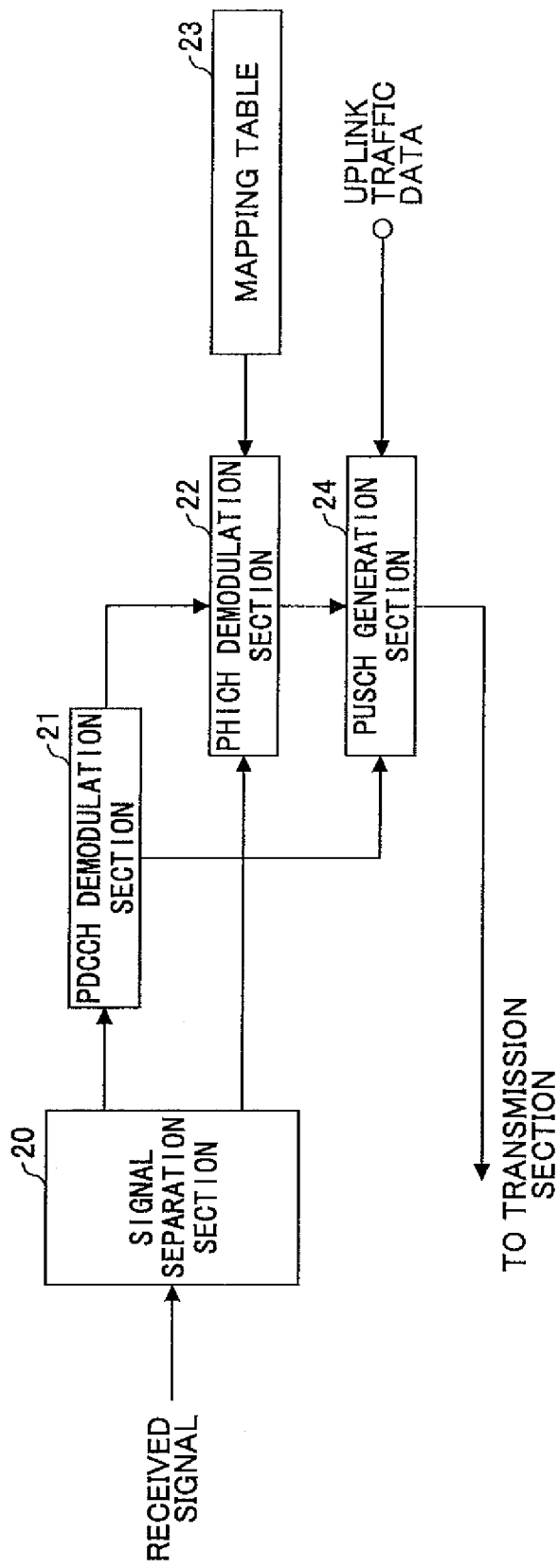
FIG. 16 is a partial block diagram of a user equipment (UE) terminal according to an embodiment of the present invention.

FIG. 16 is a partial functional block diagram of the user equipment (UE) terminal according to an embodiment of the present invention. As shown in FIG. 16, the user equipment (UE) terminal includes a signal separation section 20, a PDCCH demodulation section 21, a PHICH demodulation section 22, a mapping table 23, and a PUSCH generation section 24.

The signal separation section 20 appropriately separates the reference signal, the control channel, the Physical Downlink Shared CHannel (PDSCH) and the like from a received baseband signal. In the example of FIG. 16, a part of the control channel is especially illustrated.

The PDCCH demodulation section 21 specifies the number of OFDM symbols used for the PDCCH by reading the PCFICH. The PDCCH demodulation section 21 demodulates the PDCCHs to determine whether the PDCCH addressed to the user equipment (UE) terminal is included in the demodulated PDCCHs. When determining that the PDCCH addressed to the user equipment (UE) terminal is included, the PDCCH demodulation section 21 stores the information indicating the order (x) of the PDCCH (x-th PDCCH) in the number of multiplexed users (this process is required in the first operation example but is not necessarily required in the second operation example). By reading the PDCCH addressed to the user equipment (UE) terminal, the radio resources usable for the PUSCH and/or the PDSCH are specified.

The PHICH demodulation section 22 reads the PHICH relevant to the user equipment (UE) terminal, and determines whether the user equipment (UE) terminal is required to retransmit the PUSCH transmitted before. The user equipment (UE) terminal specifies and reads the PHICH addressed to the user equipment (UE) terminal using the mapping table 23. In the case of the first operation example, the user equipment (UE) terminal specifies the PHICH addressed to the user equipment (UE) terminal based on the mapping position of the PDCCH having been transmitted before and included the scheduling information of the PUSCH having been transmitted before. On the other hand, in the case of the second operation example, the user equipment (UE) terminal specifies the PHICH addressed to the user equipment (UE) terminal based on the number (identification number) of the resource block of the PUSCH having been transmitted before.

The PUSCH generation section 24 provides the Physical Uplink Shared CHannel (PUSCH). When the retransmission is not required, not-yet-transmitted (new) packet data (uplink traffic data) are provided as the PUSCH, and the PUSCH is transmitted to a transmission section (not shown). When the retransmission is required, the packet data to be retransmitted are provided again as the PUSCH and transmitted to the transmission section.

The present invention is described above by referring to a specific embodiment. However, the above embodiment is described for illustrative purpose only, and a person skilled in the art may think of examples of various modifications, transformations, alterations, changes, and the like. To promote an understanding of the present invention, the specific values are used as examples throughout the description. However, it should be noted that such specific values are just sample values unless otherwise described, and any other appropriate values may be used. Further, it should be noted that the division of the embodiments and the items is not essential to the present invention. For example, two or more embodiments or items may be combined on an as-needed basis, and an item described in an embodiment or an item may be applied to another embodiment or item as long as it is not contradictory. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application No. 2008-1667, filed on Jan. 8, 2008, the entire contents of which are hereby incorporated herein by reference.

The invention claimed is:

1. A base station apparatus in a mobile communication system applying an SC-FDMA scheme in uplink, the base station apparatus comprising:

one or more antennas;

a receiving unit that receives data on a physical uplink shared channel (PUSCH) from a user equipment terminal, the physical uplink shared channel (PUSCH) being assigned to one or more resource blocks, a plurality of resource blocks including the one or more resource blocks being arranged in a frequency direction occupying consecutive frequency bands in the SC-FDMA scheme applied in uplink, a resource block number being assigned to each of the resource blocks;

a generation unit comprising circuitry configured to generate Acknowledgement/Non-Acknowledgement information (ACK/NACK) for the physical uplink shared channel (PUSCH) received by the receiving unit; and a transmission unit that transmits via the one or more antennas the Acknowledgement/Non-Acknowledgement information (ACK/NACK) generated by the generation unit to the user equipment terminal, wherein the resource of the Acknowledgement/Non-Acknowledgement information (ACK/NACK) transmitted by the transmission unit corresponds to the minimum resource block number among the resource block numbers of the one or more resource blocks assigned to the physical uplink shared channel (PUSCH), wherein the Acknowledgment/Non-Acknowledgment information (ACK/NACK) transmitted to the user equipment terminal by the transmission unit, the resource of which Acknowledgement/Non-Acknowledgement information (ACK/NACK) corresponds to the minimum resource block number among the resource block numbers of the one or more resource blocks assigned to the physical uplink shared channel (PUSCH), is code-spread, and wherein the resource of the Acknowledgement/Non-Acknowledgement information (ACK/NACK) transmitted by the transmission unit is assigned to any one of I-channel and Q-channel for a single user equipment terminal and is assigned to any one of the I-channel and the Q-channel or both for a plurality of user equipment terminals.

2. A user equipment terminal in a mobile communication system applying an SC-FDMA scheme in uplink, the user equipment terminal comprising:

one or more antennas;

a transmission unit that transmits data on a physical uplink shared channel (PUSCH) to a base station apparatus, the physical uplink shared channel (PUSCH) being assigned to one or more resource blocks, a plurality of resource blocks including the one or more resource blocks being arranged in a frequency direction occupying consecutive frequency bands in the SC-FDMA scheme applied in uplink, a resource block number being assigned to each of the resource blocks; and a receiving unit that receives Acknowledgement/Non-Acknowledgement information (ACK/NACK) for the physical uplink shared channel (PUSCH) transmitted by the transmission unit, wherein the resource of the Acknowledgement/Non-Acknowledgement information (ACK/NACK) received by the receiving unit corresponds to the minimum resource block number among the resource block numbers of the one or more resource blocks assigned to the physical uplink shared channel (PUSCH) transmitted by the transmission unit, wherein the Acknowledgment/Non-Acknowledgment information (ACK/NACK) transmitted to the user equipment terminal and received by the receiving unit, the resource of which Acknowledgement/Non-Acknowledgement information (ACK/NACK) corresponds to the minimum resource block number among the resource block numbers of the one or more resource blocks assigned to the physical uplink shared channel (PUSCH), is code-spread, and wherein the resource of the Acknowledgement/Non-Acknowledgement information (ACK/NACK) received by the receiving unit is assigned to any one of I-channel and Q-channel for a single user equipment terminal and is assigned to any one of the I-channel and the Q-channel or both for a plurality of user equipment terminals.

3. A communication method for a base station apparatus in a mobile communication system applying an SC-FDMA scheme in uplink and communicating with a user equipment terminal, the method comprising the steps of:

receiving data on a physical uplink shared channel (PUSCH) from the user equipment terminal, the physical uplink shared channel (PUSCH) being assigned to one or more resource blocks, a plurality of resource blocks including the one or more resource blocks being arranged in a frequency direction occupying consecutive frequency bands in the SC-FDMA scheme applied in uplink, a resource block number being assigned to each of the resource blocks;

generating Acknowledgement/Non-Acknowledgement information (ACK/NACK) for the physical uplink shared channel (PUSCH) received in the receiving; and transmitting the Acknowledgement/Non-Acknowledgement information (ACK/NACK) generated in the generating to the user equipment terminal, wherein the resource of the Acknowledgement/Non-Acknowledgement information (ACK/NACK) transmitted in the transmitting corresponds to the minimum resource block number among the resource block numbers of the one or more resource blocks assigned to the physical uplink shared channel (PUSCH), wherein the Acknowledgment/Non-Acknowledgment information (ACK/NACK) transmitted to the user equipment terminal and received in the receiving, the resource of which Acknowledgement/Non-Acknowledgement information (ACK/NACK) corresponds to the minimum resource block number among the resource block numbers of the one or more resource blocks assigned to the physical uplink shared channel (PUSCH), is code-spread, and wherein the resource of the Acknowledgement/Non-Acknowledgement information (ACK/NACK) transmitted in the transmitting is assigned to any one of I-channel and Q-channel for a single user equipment terminal and is assigned to any one of the I-channel and the Q-channel or both for a plurality of user equipment terminals.

4. A communication method for a user equipment terminal in a mobile communication system applying an SC-FDMA scheme in uplink and communicating with a base station apparatus, the method comprising the steps of:

transmitting data on a physical uplink shared channel (PUSCH) to the base station apparatus, the physical uplink shared channel (PUSCH) being assigned to one or more resource blocks, a plurality of resource blocks including the one or more resource blocks being arranged in a frequency direction occupying consecutive frequency bands in the SC-FDMA scheme applied in uplink, a resource block number being assigned to each of the resource blocks; and receiving Acknowledgement/Non-Acknowledgement information (ACK/NACK) for the physical uplink shared channel (PUSCH) transmitted in the transmitting, wherein the resource of the Acknowledgement/Non-Acknowledgement information (ACK/NACK) received in the receiving corresponds to the minimum resource block number among the resource block numbers of the one or more resource blocks assigned to the physical uplink shared channel (PUSCH) transmitted in the transmitting, wherein the Acknowledgment/Non-Acknowledgment information (ACK/NACK) transmitted to the user equipment terminal and received in the receiving, the resource of which Acknowledgement/Non-Acknowledgement information (ACK/NACK) corresponds to the minimum resource block number among the resource block numbers of the one or more resource blocks assigned to the physical uplink shared channel (PUSCH), is code-spread, and wherein the resource of the Acknowledgement/Non-Acknowledgement information (ACK/NACK) received in the receiving is assigned to any one of I-channel and Q-channel for a single user equipment terminal and is assigned to any one of the I-channel and the Q-channel or both for a plurality of user equipment terminals.

5. A communication system applying an SC-FDMA scheme in uplink, the communication system comprising:

a user equipment terminal that transmits data on a physical uplink shared channel (PUSCH) that is assigned to one or more resource blocks, a plurality of resource blocks including the one or more resource blocks being arranged in a frequency direction occupying consecutive frequency bands in the SC-FDMA scheme applied in uplink, a resource block number being assigned to each of the resource blocks; and a base station apparatus that generates Acknowledgement/Non-Acknowledgement information (ACK/NACK) for the physical uplink shared channel (PUSCH) received from the user equipment terminal and transmits the generated Acknowledgement/Non-Acknowledgement information (ACK/NACK) to the user equipment terminal, wherein the resource of the Acknowledgement/Non-Acknowledgement information (ACK/NACK) transmitted by the base station apparatus corresponds to the minimum resource block number among the resource block numbers of the one or more resource blocks assigned to the physical uplink shared channel (PUSCH) received by the base station apparatus, wherein the Acknowledgment/Non-Acknowledgment information (ACK/NACK) transmitted to the user equipment terminal by the base station apparatus, the resource of which Acknowledgement/Non-Acknowledgement information (ACK/NACK) corresponds to the minimum resource block number among the resource block numbers of the one or more resource blocks assigned to the physical uplink shared channel (PUSCH), is code-spread, and wherein the resource of the Acknowledgement/Non-Acknowledgement information (ACK/NACK) transmitted by the base station is assigned to any one of I-channel and Q-channel for a single user equipment terminal and is assigned to any one of the I-channel and the Q-channel or both for a plurality of user equipment terminals.

* * * * *